No. 720,202. PATENTED FEB. 10, 1903.
F. WHITE.
KNIFE.
APPLICATION FILED MAY 1, 1901.
NO MODEL.

Witnesses
Inventor
Frank White
By
Attorney

UNITED STATES PATENT OFFICE.

FRANK WHITE, OF NEW YORK, N. Y.

KNIFE.

SPECIFICATION forming part of Letters Patent No. 720,202, dated February 10, 1903.

Application filed May 1, 1901. Serial No. 58,313. (No model.)

*To all whom it may concern:*

Be it known that I, FRANK WHITE, a citizen of the United States, residing at New York, in the county of New York and State of New York, have invented certain new and useful Improvements in Knives; and I do hereby declare the following to be a full, clear, and exact description of the invention, such as will enable others skilled in the art to which it appertains to make and use the same.

This invention provides a knife especially designed to facilitate the dismemberment of the frame of fowl and the separation of joints and tendons of meat when carving the same at table and to combine therewith as an integral part means for opening packages—such as canned meats, fish, and other goods—preliminary to slicing or cutting the same for service.

The invention consists of a knife having its outer end notched or indented to form prongs, one of which by preference is pointed and extended for readily penetrating the object to be acted upon by the end of the knife-blade, whether it be a joint of meat or a package. The other or shorter prong acts as a fulcrum for the penetrating prong when used as a pry.

The knife is eminently adapted for opening canned meats, as it also combines means for slicing the meat after it has been removed, thereby obviating the use of independent implements for removal of the goods from the can and for cutting up the food when clear of the package.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1:
Figure 2:
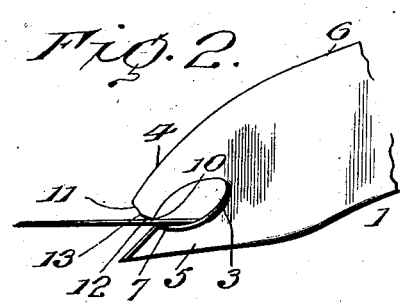
Figure 3:
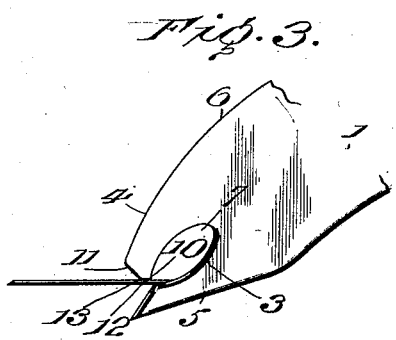
Figure 4:
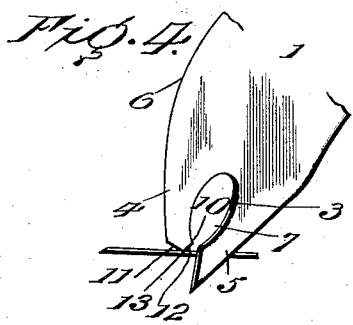
Figure 5:
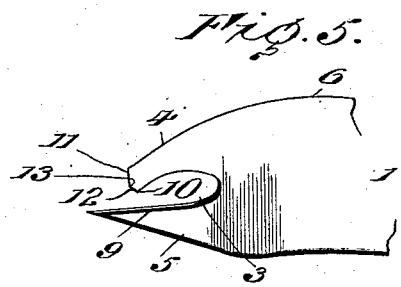
Figure 6:
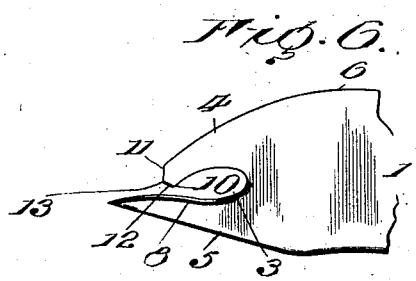

Figure 1 is a side elevation of a knife embodying the invention, the same being inverted and having its cutting edge uppermost. Figs. 2, 3, and 4 are detail views of the end portion of the knife on a larger scale, showing different positions. Figs. 5 and 6 show modifications.

Corresponding and like parts are referred to in the following description and indicated in all the views of the drawings by the same reference characters.

The knife-blade 1 may be of any size or pattern, according to the particular use for which it is designed, and is provided with the usual handle 2. The knife-blade may be of the form used either by butchers, store-keepers, or of the pattern for slicing bread and cake or carving meats. In accordance with this invention the outer end of the knife-blade is indented or formed with a notch 3 of elongated form to provide prongs 4 and 5, and this notch or indentation extends lengthwise of the knife-blade, so as to leave sufficient metal at each side of the notch 3 to provide substantial prongs for withstanding the strain to which they will be subjected when in service. The prongs differ in length, the prong 5 being the longer and pointed to more readily penetrate the object to be acted upon. The prong 4 is adjacent to the cutting-edge 6 of the knife and is shorter than the prong 5 to constitute an effective fulcrum when using the prong 5 as a pry, either for parting a tendon or joint or when opening a package, such as a can of meat or other goods. It is well known that the back portion of a knife is heavier and stouter than the cutting-edge portion. Hence the prying or cutting prong 5 is located adjacent to the back portion of the knife-blade, so as to withstand the strain without bending or breaking. The edge of the prong 5 facing the notch or opening 3 is preferably sharpened, so as to cut more readily the part to be severed thereby. This edge may be concave, as shown at 7 in Figs. 1, 2, 3, and 4, or convex, as shown at 8 in Fig. 6, or straight, as shown at 9 in Fig. 5. The concave edge 7 gives the best results and for this reason is preferred, the other forms of cutting edge being illustrated because contemplated within the purview of the invention. In all the forms it is essential that the prong 5 be pointed, so as to readily penetrate the part to which the end portion of the knife-blade is to be applied in accordance with the foregoing.

The part 5 may be properly designated as the "prying" and "separating" prong and the part 4 as the "fulcrum-prong." The prong 4 is somewhat blunt and has an inner point 10, forming the fulcrum upon which the knife-blade rocks or turns when the prong 5 is in operation. This point 10 is formed by the intersection of the outer edge of the prong and the adjacent edge bordering upon the notch of opening 3. The outer edge of the prong 4 is formed on the straight lines 11 and 12, which intersect to form the point 13, serving as a second fulcrum. These lines 11 and 12 are arranged at an obtuse angle. Hence the fulcrum-point 13 is, like the fulcrum-point 10, blunt, so as to indent the metal top without penetration thereof when the knife is used as a can-opener.

The embodiment of the invention in a carving, bread, or butcher's knife does not detract from the usual service and application of an implement of this character, but rather enhances its value, since it provides means for opening a metal package to admit of the removal of canned meats and enables the same implement to be used for slicing or cutting the meat into proper shape for service. Moreover, for carving it provides a knife-blade with means for severing a tendon or prying apart joints, which usually can only be effected by a keen-edged blade and a skilful manipulation thereof.

For opening a package such as a can the point of the prong 5 is forced through the cover or part thereof and the knife lowered into the position about as shown in Fig. 2, whereby the prong 5 is caused to pass well under the cover or side of the can, and the fulcrum-point 10 of the prong 4 is brought against the outer side of the side or top of the can, and upon lifting upon the handle end of the knife the prong 5 is caused to move upward and forward, thereby cutting the can. This operation is repeated, the knife being advanced and its handle being oscillated vertically, thereby cutting the can, so as to admit of the contents being easily removed when, if desired, the knife may be used for slicing or cutting up the same into pieces of desired size. As the strain on the point increases by raising the rear end of the knife the resistance to penetration of the can-top by the said point 10 decreases by the gradual approach of the straight edge 12 to the plane of the top, and when the knife reaches the position about as shown in Fig. 3 the straight edge 12 rests upon the top and a further lifting of the rear end of the knife brings the fulcrum-point 13 into play, as shown in Fig. 4. These two fulcrum-points 10 and 13 enable a greater movement of the blade than if one point only were provided.

Having thus described the invention, what is claimed as new is—

1. A blade having an elongated opening at its outer end, and having prongs of different length at the sides of the said opening, the longer prong being pointed and sharpened along its inner edge, and the shorter prong having an inner fulcrum and having its outer edge formed by two straight edges arranged at an obtuse angle to each other and intersecting to form a second fulcrum-point, substantially as specified.

2. A new article of manufacture, a knife having an elongated opening at its outer end and prongs of different length at the sides of the said opening, the longer prong being pointed and sharpened along its inner edge and the shorter prong having two fulcrum-points at its outer end arranged one in advance of the other, the outer point being at the intersection of two straight edges extending at an obtuse angle to each other, substantially as set forth.

In testimony whereof I affix my signature in presence of two witnesses.

FRANK WHITE. [L. S.]

Witnesses:
FRANK A. NEWELL,
E. L. MCCUNE.